United States Patent
Chen et al.

(10) Patent No.: US 7,609,067 B1
(45) Date of Patent: Oct. 27, 2009

(54) ELECTRONIC PORTION OF AN ION GAUGE WITH ION COLLECTORS BOWED OUT OF PLANE TO FORM A THREE DIMENSIONAL ARRANGEMENT

(75) Inventors: Chien-Hua Chen, Corvallis, OR (US); James McKinnell, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 966 days.

(21) Appl. No.: 11/269,960

(22) Filed: Nov. 9, 2005

(51) Int. Cl.
*G01L 21/30* (2006.01)

(52) U.S. Cl. .............. 324/460; 324/459; 324/462; 324/464; 324/468; 324/470; 315/111.91; 250/423 R; 250/424; 250/427; 250/489; 250/336.1; 250/389

(58) Field of Classification Search .......... 250/423 R, 250/424, 427, 489, 336.1, 389; 324/459, 324/460, 462, 464, 468, 470; 315/111.91; 977/932, 939, 953, 956, 957
See application file for complete search history.

(56) References Cited

U.S. PATENT DOCUMENTS 4,747,311 A * 5/1988 Hojoh ..................... 73/702
5,493,177 A * 2/1996 Muller et al. ............ 313/578
6,051,923 A * 4/2000 Pong ....................... 313/495
6,995,502 B2 * 2/2006 Hwu et al. ............... 313/293

FOREIGN PATENT DOCUMENTS

WO    WO 95/12211    5/1995

\* cited by examiner

*Primary Examiner*—David A Vanore
*Assistant Examiner*—Michael Maskell

(57) ABSTRACT

Embodiments of the present invention pertain to an electronic portion of a MEMs ion gauge with ion collectors bowed out of plane to form a three dimensional arrangement and a method for forming an electronic portion of a MEMs ion gauge with ion collectors bowed out of plane to form a three dimensional arrangement. In one embodiment, an ion gauge substrate is formed. The electronic portion of the MEMs ion gauge is assembled by coupling a plurality of ion collectors with the ion gauge substrate, wherein the coupling of the plurality of ion collectors with the ion gauge substrate further comprises performing an operation that causes the plurality of ion collectors to be bowed out of plane to form a three dimensional arrangement.

23 Claims, 20 Drawing Sheets

US 7,609,067 B1

ELECTRONIC PORTION OF AN ION GAUGE WITH ION COLLECTORS BOWED OUT OF PLANE TO FORM A THREE DIMENSIONAL ARRANGEMENT

TECHNICAL FIELD

Embodiments of the present invention relate to ion gauges. More specifically, embodiments of the present invention relate to ion gauges with ion collectors bowed out of plane to form a three dimensional arrangement.

BACKGROUND ART

Frequently, there is a need to measure the vacuum level of a package. For example, a MicroElectroMechanical System (MEM) is typically a very small device that can be used to sense pressure, temperature, chemical, vibration, light, among other things, in packaging devices (MEM's package). There is a need for maintaining a vacuum in MEMs packages. Ion gauges can be used, among other things, for measuring the vacuum level by measuring the ratio between an ion current and an electrical current, as will become more evident.

One type of ion gauge uses vacuum tubes. However, vacuum tube type ion gauges are too big and bulky to be used for measuring the level of vacuum in a MEMs package where the internal volume is small. Further, vacuum tube type ion gauges are expensive.

Alternatively, MEMs ion gauges, which typically are small and inexpensive to manufacture, can be used for measuring the level of vacuum in a MEMs packages. FIG. 1A depicts a cross-section view of a conventional electronic portion of a MEMs ion gauge and FIG. 1B depicts a side view of a conventional electronic portion of a MEMs ion gauge. The electronic portion of a MEMs ion gauge 100 typically includes hot filaments 122, bias grids 124, and ion collectors 126. As depicted in FIG. 1A, the ion collectors 126 are shielded from the hot filaments 124 and the bias grids 124 because they (122, 124, 126) are in a single plane. The filaments 122, bias grids 124 and ion collectors 126 extend over a trench 110 and are coupled to an ion gauge substrate 140. Bond pads 130 provide electric connection to the ion gauge 100. The ion collectors 126 can be negatively charged, for example, by using −40 Volts. The bias grids 124 can be positively charged, for example, by using +100 Volts.

FIG. 2A depicts a top-down view of a conventional electronic portion of a MEMs ion gauge 100. FIG. 2B depicts a side view of a conventional electronic portion of a MEMs ion gauge 100. Referring to FIGS. 2A, 2B, the hot filaments 122 boil off electrons (e.g., "e−"), the positively charged bias grids 124 accelerate the electrons, and the negatively charged ion collectors 126 gather the positively charged ions (e.g., "ions+"). Referring to FIG. 2B, the ions are generated when the highly accelerated electrons collide with the residual gas molecules so that the ratio of ion current to the electron current at the bias grids 124 (e.g., Iion I$_{ion}$/I$_{electron}$) is inversely proportional to the vacuum level. Therefore, the ion current can be expressed as in equation 1 depicted below:

$$I_i = I_e PaL \quad (1)$$

Thus, the ion current ($I_i$) is proportional to the electron current $I_e$, times the cavity pressure P, times the ionization rate a, times the electron path length L.

However as will be explained in more detail, the typical ion gauge 100 as depicted in FIGS. 1A, 1B, 2A, 2B does not accurately measure the vacuum level in a package. For these and other reasons, an ion gauge that accurately measures the vacuum level is desired. An ion gauge that is small would also be valuable. An ion gauge that is inexpensive to manufacture would also be valuable. An ion gauge that is small, inexpensive to manufacture, and that accurately measures the vacuum level would also be valuable.

DISCLOSURE OF THE INVENTION

Embodiments of the present invention pertain to an electronic portion of a MEMs ion gauge with ion collectors bowed out of plane to form a three dimensional arrangement and a method for forming an electronic portion of a MEMs ion gauge with ion collectors bowed out of plane to form a three dimensional arrangement. In one embodiment, an ion gauge substrate is formed. The electronic portion of the ion gauge is assembled by coupling a plurality of ion collectors with the ion gauge substrate, wherein the coupling of the plurality of ion collectors with the ion gauge substrate further comprises performing an operation that causes the plurality of ion collectors to be bowed out of plane to form a three dimensional arrangement.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
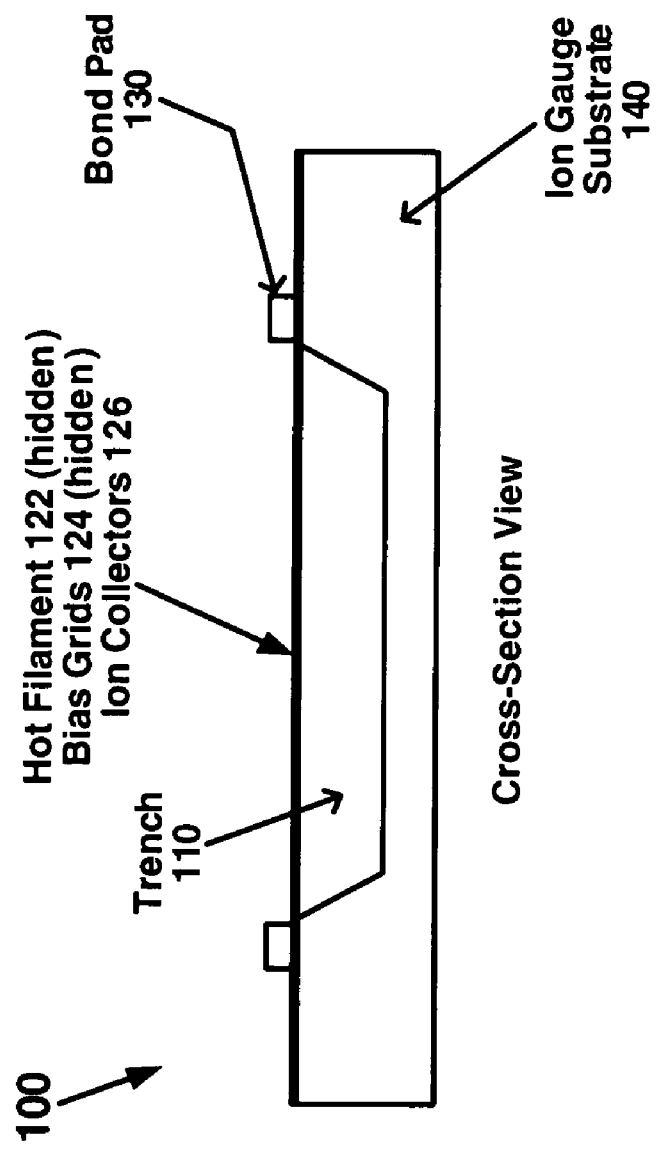
FIG. 1A depicts a cross-section view of a conventional electronic portion of a MEMs ion gauge.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview of an Electronic Portion of an Ion Gauge that has Ion Collectors Bowed Out of Plane to Form a Three Dimensional Arrangement Referring to the conventional electronic portion of a MEMs ion gauge 100 depicted in FIGS. 1A-2B, the hot filaments 122, bias grids 124 and ion collectors 126, and connections to the bond pads 130 of a conventional electronic portion of a MEMs ion gauge 100 participate in collecting ions. Thus, they (e.g., hot filaments 122, bias grids 124 and ion collectors 126, and connections to the bond pads 130) interfere with the accuracy of the conventional MEMs ion gauge 100 in measuring the level of vacuum. More specifically, the bias grids 124, ion collectors 126 and connections to bond pads 130 participate in collecting ions due to the bond pads 130 (FIG. 1A) being too close to the trench 110. For example, the bond pads 130 are adjacent to the trench 110 in the conventional electronic portion of a MEMs ion gauge 100. As a result, connections to the bond pads 130 and the bond pads 130 participate in collecting ions. The accuracy of measuring the vacuum level can be improved by moving the bond pads 130 further away from the trenches 110, according to one embodiment of the present invention as will be discussed further hereinafter.

Figure 1B:
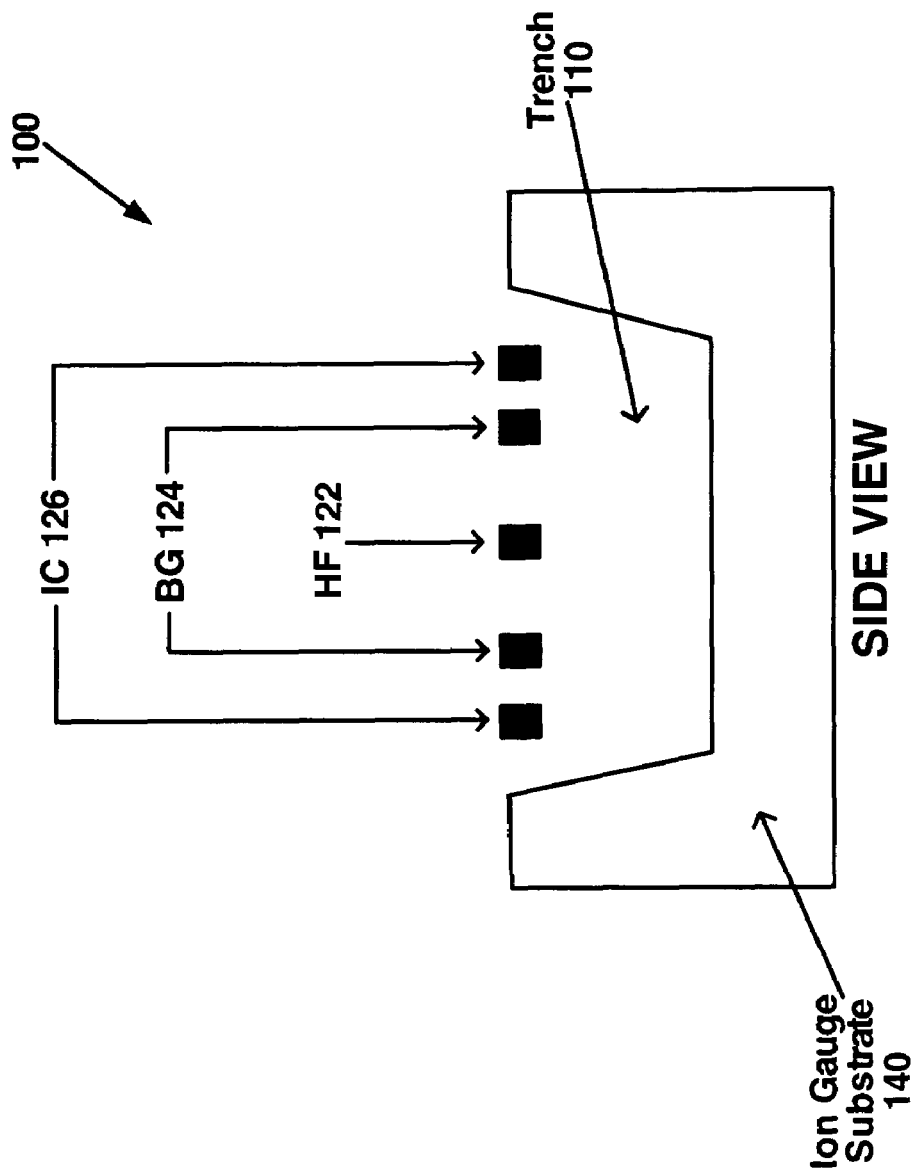
FIG. 1B depicts a side view of a conventional electronic portion of a MEMs ion gauge.
Figure 2A:
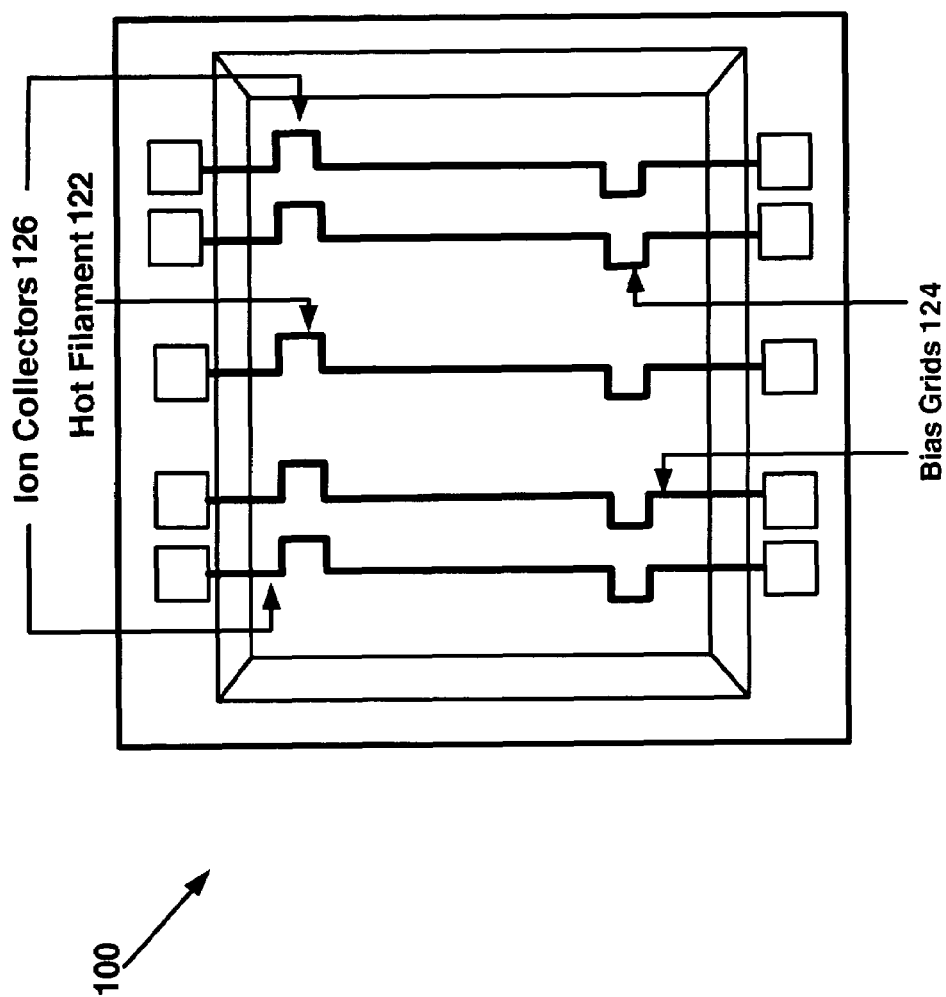
FIG. 2A depicts a top-down view of a conventional electronic portion of a MEMs ion gauge.
Figure 2B:
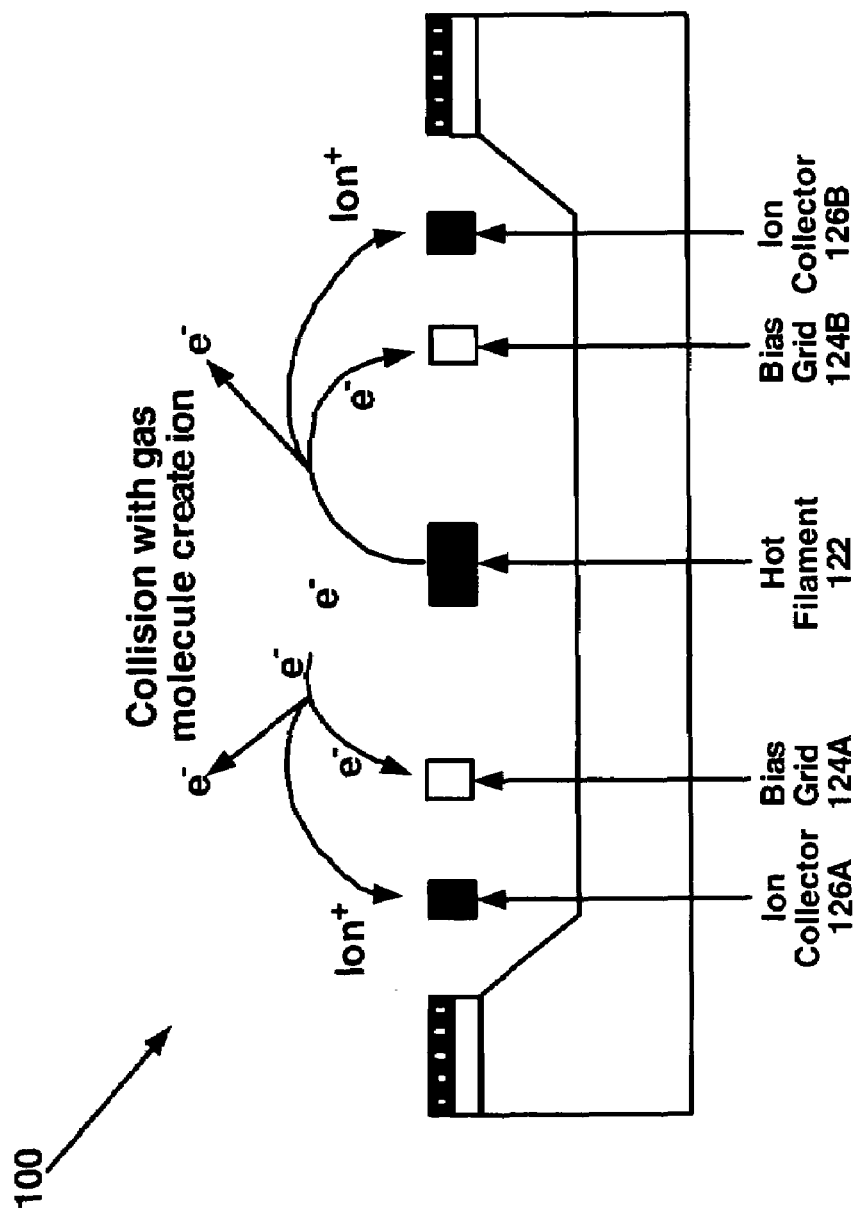
FIG. 2B depicts a side view of a conventional electronic portion of a MEMs ion gauge.

Further, the accuracy of an ion gauge in measuring the level of vacuum in a package is affected by the probability of electrons colliding with residual gas molecules. Referring to FIGS. 1A and 1B, the hot filament 122, bias grids 124, and the ion collectors 126 of the conventional electronic portion of a MEMs ion gauge 100 all reside in the same plane and therefore are form a two dimensional arrangement. In contrast, according to embodiments of the present invention an electronic portion of an ion gauge with hot filaments 122, bias grids 124, or ion collectors 126 that are bowed out of plane to form a three dimensional arrangement is provided. A three dimensional arrangement improves the accuracy of measuring a vacuum level over that of a conventional two dimensional arrangement since a three dimensional arrangement increases the probability of electrons colliding with residual gas molecules, as will become more evident.

Figure 8:
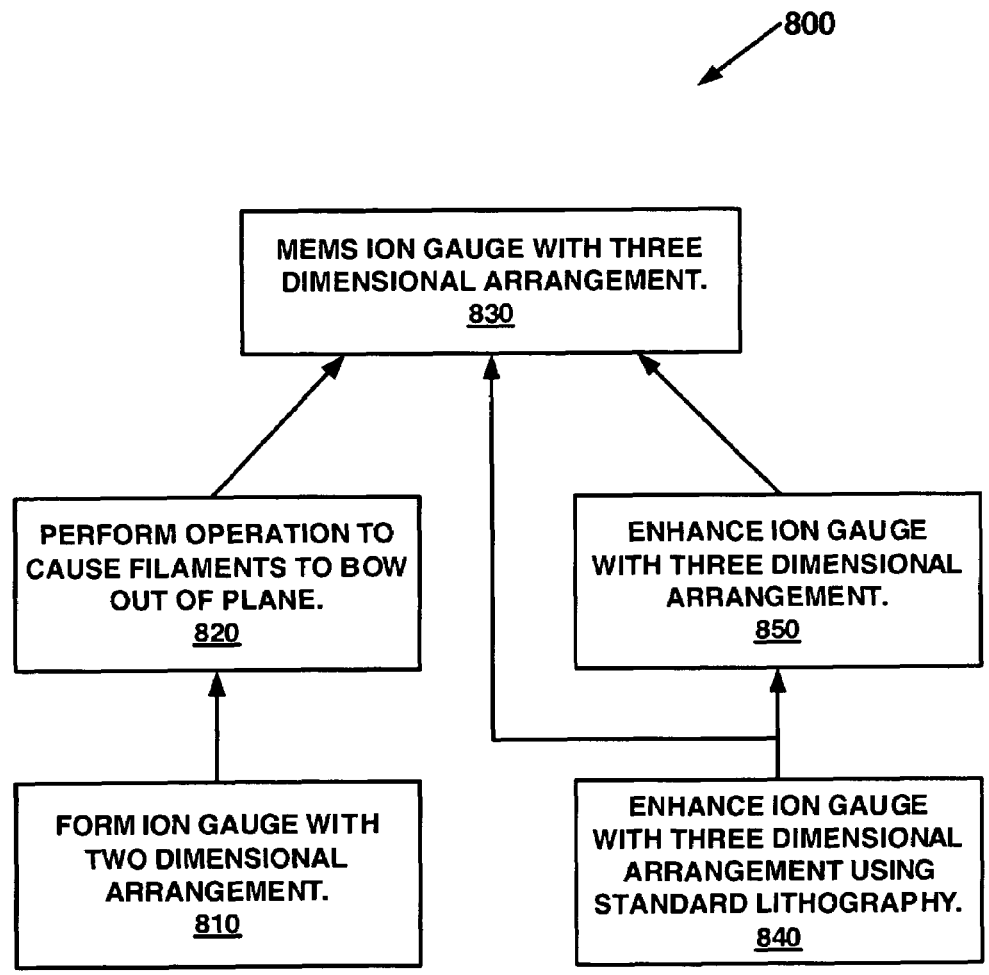
FIG. 8 depicts a flowchart for methods of forming an electronic portion of MEMs ion gauge with ion collectors bowed out of plane to form a three dimensional arrangement, according to embodiments of the present invention The drawings referred to in this description should not be understood as being drawn to scale except if specifically noted.

Standard lithography, thermal cycles, or a combination of both can be used to form a portion of a MEMs ion gauge with hot filaments, bias grids, or ion collectors that are bowed out of plane to form a three dimensional arrangement, according to embodiments of the present invention. For example, FIG. 8 depicts a flowchart for methods of forming an electronic portion of MEMs ion gauge with ion collectors bowed out of plane to form a three dimensional arrangement, according to embodiments of the present invention. For example, in step 810 a portion of a MEMs ion gauge is formed with hot filaments, bias grids, or ion collectors that form a two dimensional arrangement. In step 820, the MEMs ion gauge is subjected to an operation (step 820) that causes the hot filaments, bias grids, or ion collectors to be bowed out of plane to form a three dimensional arrangement. The process stops at 830.

According to another embodiment, in step 840 standard lithography can be used to form a portion of a MEMs ion gauge with hot filaments, bias grids, or ion collectors that are bowed out of plane to form a three dimensional arrangement. At step 830, the process can stop or the portion of a MEMs ion gauge from step 840 can be enhanced in step 850, for example using thermal cycles. For example, thermal cycles can be used in step 850 to increase the amount that the hot filaments, bias grids, or ion collectors are permanently bowed out of plane.

Figure 3A:
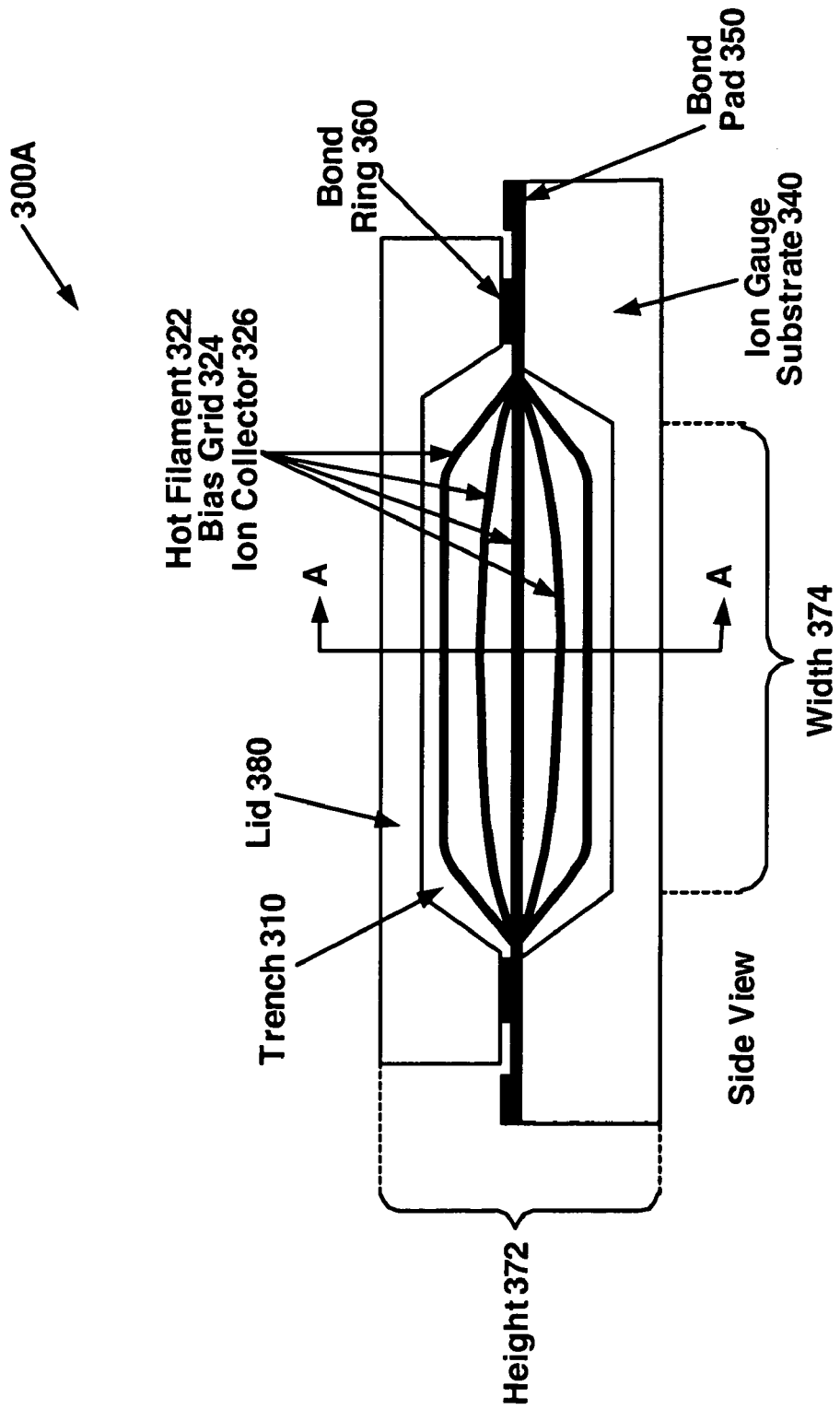
FIG. 3A depicts a side view of the electronic portion of a MEMs ion gauge with a hot filament bowed out of plane to form a three dimensional arrangement using thermal expansion and recrystallization, according to embodiments of the present invention.
Figure 3B:
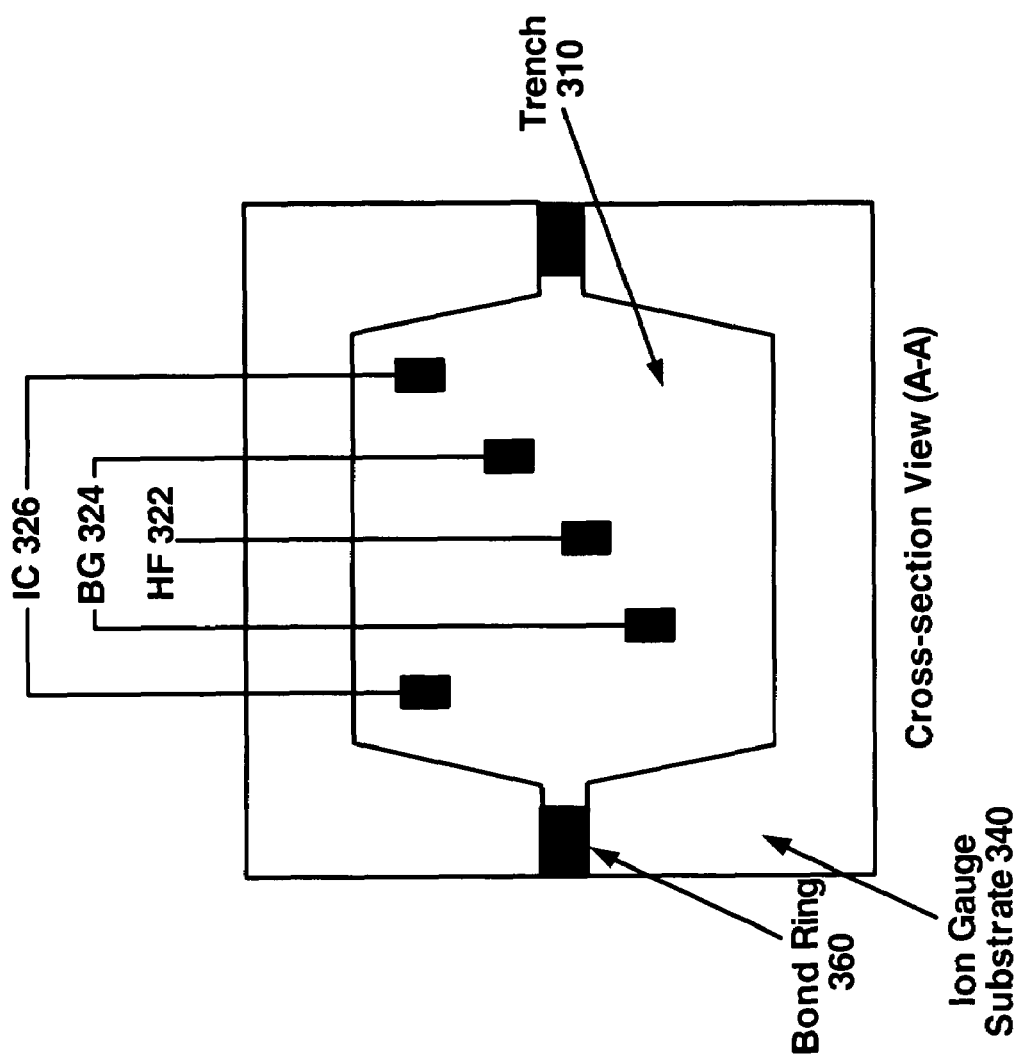
FIG. 3B depicts a side view of the MEMs ion gauge depicted in FIG. 3A, according to embodiments of the present invention.
Figure 3C:
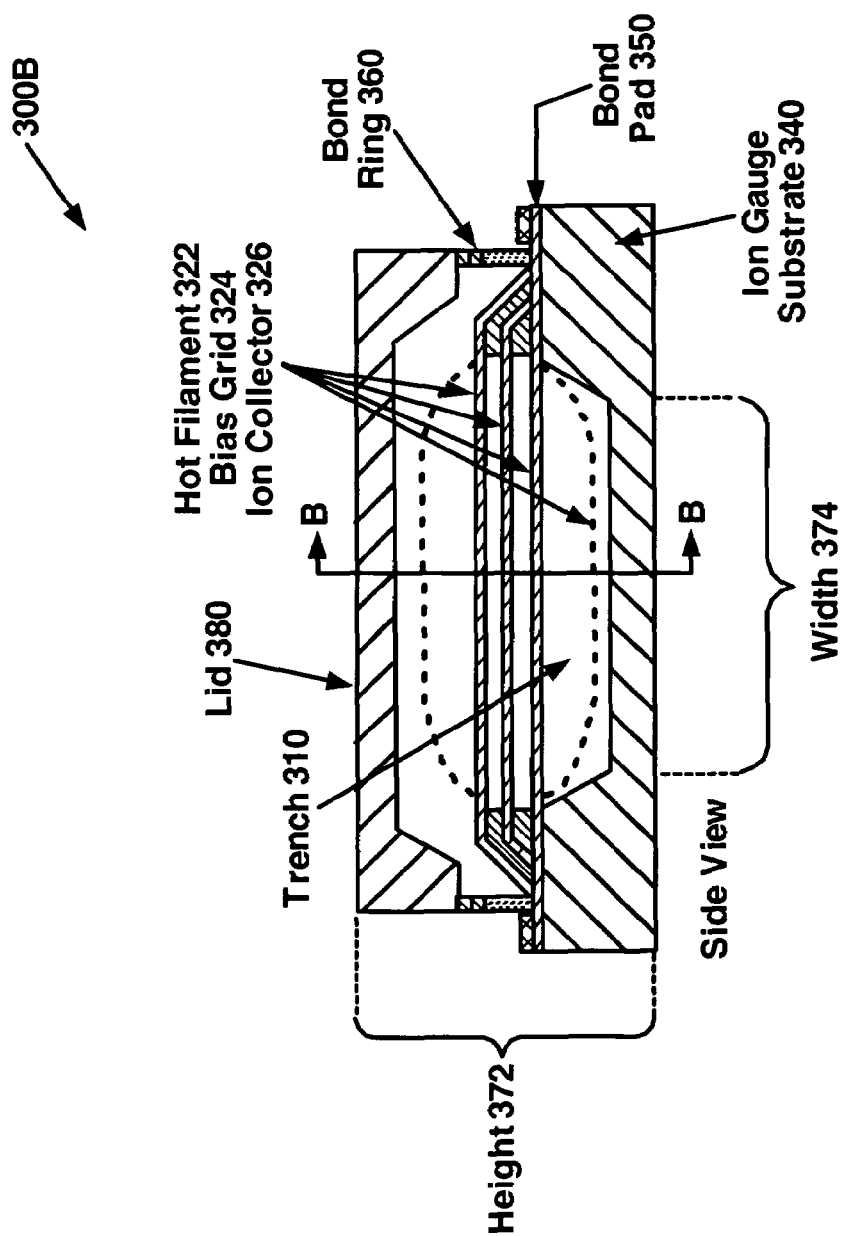
FIG. 3C depicts a side view of the electronic portion of the MEMs ion gauge with a three dimensional arrangement that was formed using standard lithography techniques and the three dimensional structure was subsequently enhanced with hot filaments bowed out of plane using thermal expansion and recrystallization, according to embodiments of the present invention.
Figure 3D:
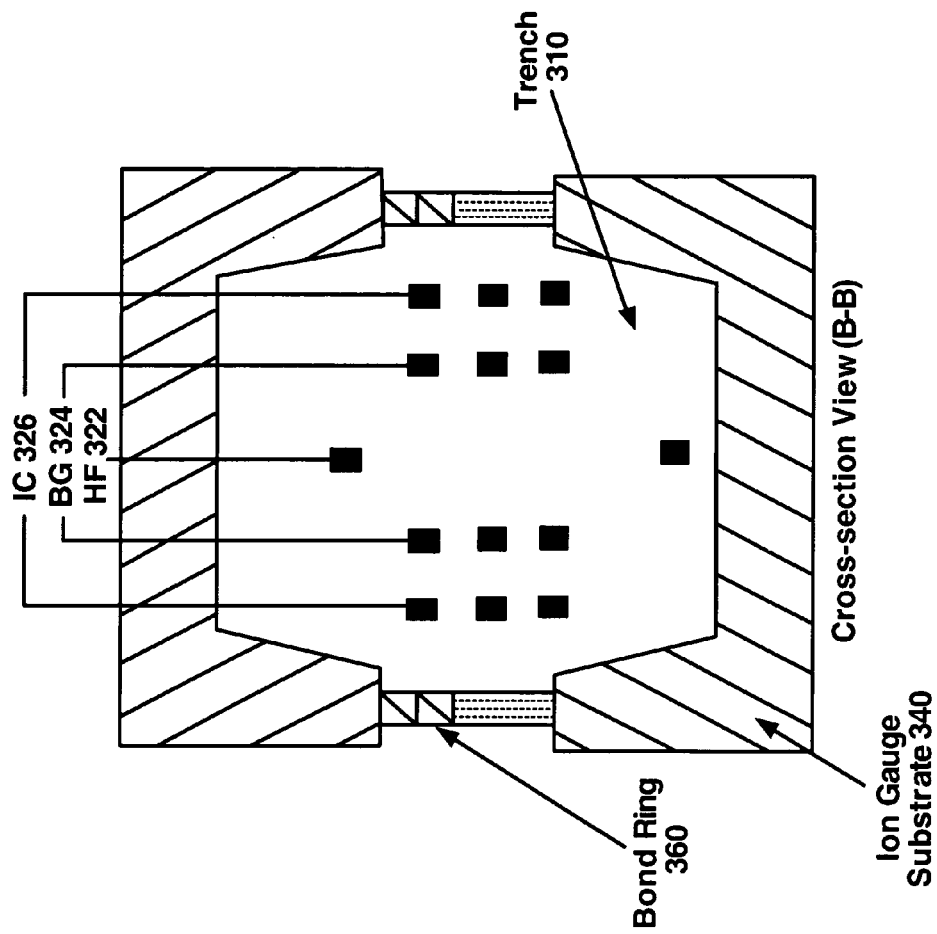
FIG. 3D depicts a side view of the ion gauge depicted in FIG. 3C, according to embodiments of the present invention.

An Electronic Portion of an Ion Gauge that has Ion Collectors Bowed Out of Plane to Form a Three Dimensional Arrangement According to one embodiment of the present invention, FIG. 3A depicts a side view of the electronic portion of a MEMs ion gauge with hot filament bowed out of plane to form a three dimensional arrangement using thermal expansion and recrystallization, and FIG. 3B depicts a side view of the ion gauge depicted in FIG. 3A. According to another embodiment of the present invention, FIG. 3C depicts a side view of the electronic portion of the MEMs ion gauge that was formed using standard lithography techniques following formation using standard lithography techniques, if desired, a subset of the filaments may be bowed out of plane to form a three dimensional arrangement using thermal expansion and recrystallization. FIG. 3D depicts a side view of the electronic portion of the ion gauge depicted in FIG. 3C. The electronic portions of ion gauges 300A, 300B are MEMs type electronic portions of ion gauges, according to embodiments of the present invention.

The electronic portions of ion gauges 300A, 300B include an ion gauge substrate 340, hot filaments 322, bias grids 324, and ion collectors 326, and bond pads 350. For the purposes of the present invention, various components of the electronic portions of ion gauges 300A, 300B shall be described as follows. A hot filament 322 refers to an electron source. For example, an electron source can be a carbon nanotube or a SPINDT Emitter, among other things. For the purposes of the present application, an ion collector 326 refers to a component of the electronic portion of an ion gauge 300A, 300B that collects ions. It will be understood that typically an electron will ionize gas present and when collected by the ion collector 326 will result in a reading. It shall be understood for the purposes of the present invention, that a bias grid 324 is positively biased and collects electrons but can also collect ions.

Bond rings 360 are used, among other things, for coupling the lid 380 to the ion gauge substrate 340. The electronic portions of ion gauges 300A, 300B as depicted in FIGS. 3A-3D have an associated height 372 and width 374, as will be described in more detail hereinafter. Further, the trench 310 of the electronic portions of ion gauges 300A, 300B have an associated length 376.

According to embodiments of the present invention, an electronic portion of an ion gauge 300A, 300B has a plurality of hot filaments 322, a plurality of bias grids 324, and a plurality of ion collectors 326 that are bowed out of plane to form a three dimensional arrangement using standard lithography techniques, bowing the filaments out of plane, for example using thermal cycles, following integrated circuit lithography techniques, or a combination of both. Since, the accuracy of an ion gauge in measuring the level of vacuum in a package is affected by the probability of electrons to collide with residual gas molecules, a three dimensional arrangement improves the accuracy of measuring a vacuum level over that of a two dimensional arrangement.

The three dimensional arrangement formed by the hot filaments 322, bias grids 324, and ion collectors 326 that are bowed out of plane results in a "larger arrangement volume" of the hot filaments 322, the bias grids 324 and the ion collectors 326, according to embodiments of the present invention, than what is found in conventional electronic portions of ion gauges 100 (FIGS. 1A, 1B). For example, note that with the conventional electronic portion of an ion gauge 100 (FIGS. 1A, 1B) all of the hot filament 122, bias grids 124, and ion collectors 126 are in a single plane, whereas with the electronic portions of ion gauges 300A, 300B the hot filaments 322, bias grids 324, and ion collectors 326 are not arranged in a single plane (e.g., are out of plane and form a three dimensional arrangement) and therefore, cover a larger volume. A "larger arrangement volume" increases the probability of gas molecules colliding with ions. Therefore, the electronic portion of an ion gauge 300A, 300B, according to embodiments of the present invention, is more accurate in measuring vacuum level than a conventional electronic portion of an ion gauge 100.

Dimensions

As already stated, an electronic portion of an ion gauge 300A, 300B has an associated height 372, length 376, and width 374. According to one embodiment, the length 376 ranges from 1 millimeter (mm) to 20 mms, the width 374 of the trench 310 is approximately 0.5 mm, and the height 372 is approximately the height of a one-two semi-conductor wafers. Typically the height of a semi-conductor wafer is approximately 675 microns.

As already stated, the hot filaments 122, bias grids 124 and ion collectors 126, and connections to the bond pads 130 of a conventional electronic portion of a MEMs ion gauge 100 participate in collecting ions. Thus, they (e.g., hot filaments 122, bias grids 124 and ion collectors 126, and connections to the bond pads 130) interfere with the accuracy of the conventional MEMs ion gauge 100 in measuring the level of vacuum. More specifically, the bias grids 124, ion collectors 126 and connections to bond pads 130 participate in collecting ions due to the bond pads 130 (FIG. 1A) being too close to the trench 110. According to one embodiment, the bond pads 350 are approximately 5000 to 6000 microns from the trench 310 to avoid interference of the interconnect with the electronic portion of the MEMs ion gauge 300A, 300B, thus, enabling the electronic portion of MEMs ion gauge 300A, 300B to measure vacuum levels accurately.

Materials and Profiles

The bond rings 360 can be made out of Au88Ge12 (wt %) eutectic solder, Au80Sn20 (wt %), Au, Cu, Au10Sn90 (wt %), among other things, according to one embodiment According to one embodiment, traces that are used for forming hot filaments 322, bias grids 324, and/or ion collectors 326 are made out of refractory metals. Examples of refractory metals include, but are not limited to, Tungsten, Thoriated Tungsten, Tantalum, Zirconium, Hafnium, Niobium, and Molybdenum.

The hot filaments 322, bias grids 324, and/or ion collectors 326 can be formed with different profiles (e.g., shape of the cross section). For example, the profile of the hot filaments 322, bias grids 324, and/or ion collectors 326 can have a trapezoid shape with the long side adjacent to the ion gauge substrate 340, a trapezoid shape with the short side of the trapezoid adjacent to the ion gauge substrate 340, or a rectangular shape with one side adjacent to the ion gauge substrate 340. The profile of the hot filaments 322, bias grids 324, and/or ion collectors 326 can be used as a part of controlling the direction that the hot filaments 322, bias grids 324, and/or ion collectors 326 bend, as will become more evident. The profile is created using standard thin film processing techniques, according to one embodiment.

Figure 4A:
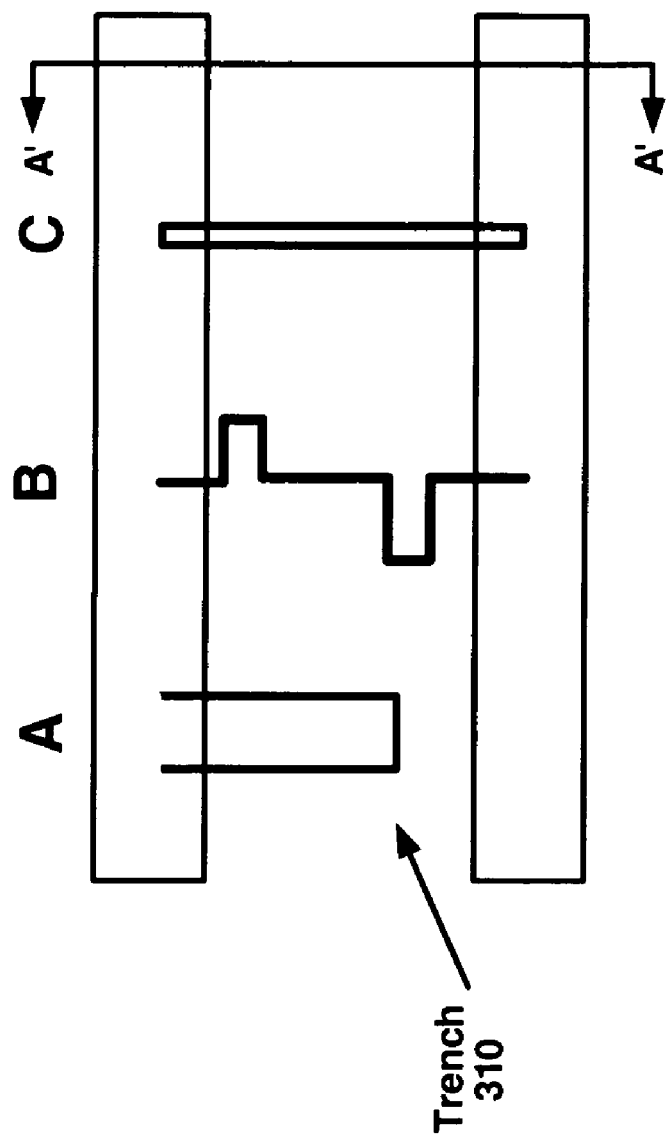
FIG. 4A depicts a top down view of an electronic portion of a MEMs ion gauge with traces bowed out of plane to form a three dimensional arrangement, according to one embodiment.
Figure 4B:
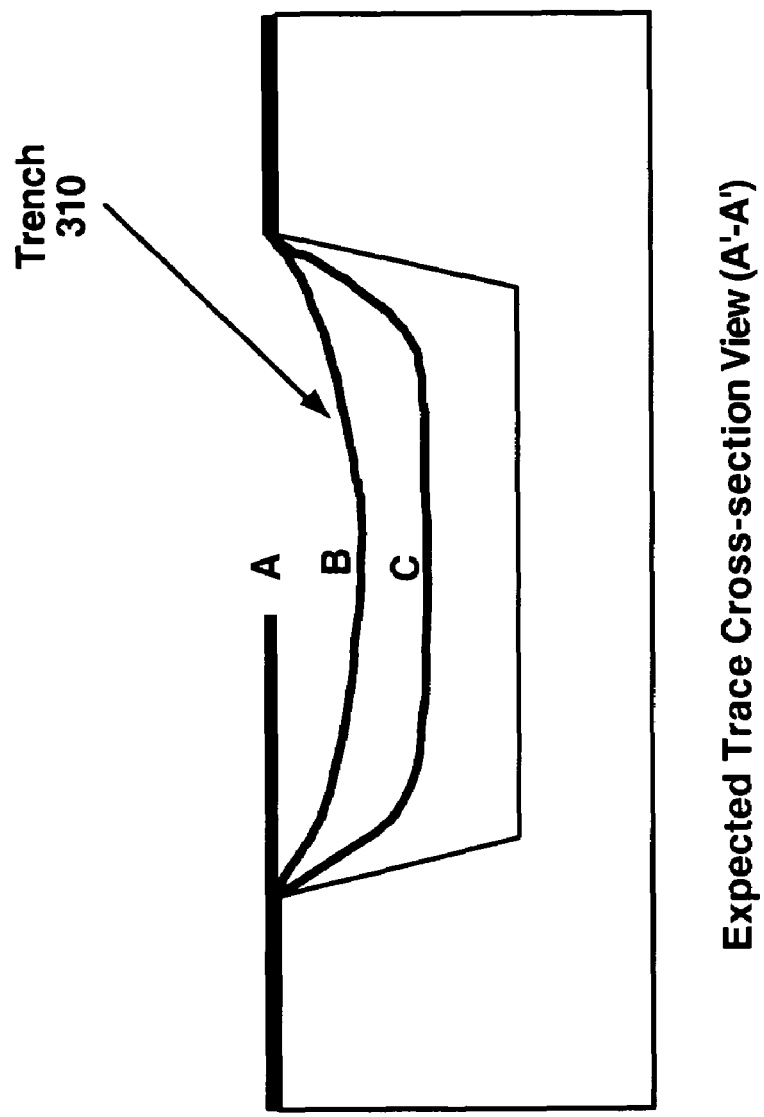
FIG. 4B depicts an cross section view of the electronic portion of a MEMs ion gauge depicted in FIG. 4A, according to one embodiment.

Hot Filaments, Bias Grids, and Ion Collectors that are Bowed Out of Plane to Form a Three Dimensional Arrangement According to another embodiment, the hot filaments 322, bias grids 324, and/or ion collectors 326 are bowed out of plane to form a three dimensional arrangement. For example, the hot filaments 322, bias grids 324, and/or ion collectors 326 can be bowed out of plane to form a three dimensional arrangement using high temperature thermal cycles produced for example by passing an electrical current through the traces that form the hot filaments 322, bias grids 324, and/or ion collectors 326. FIG. 4A depicts a top down view of an electronic portion of a MEMs ion gauge with traces bowed out of plane to form a three dimensional arrangement and FIG. 4B depicts an cross section view of the electronic portion of an ion gauge depicted in FIG. 4A, according to one embodiment. For example, FIG. 4A depicts a top down view of an electronic portion of an ion gauge 300A, 300B with bowed tungsten traces A, B, C that has a side view A'-A'. FIG. 4B depicts the same electronic portion 300A, 300B from the cross section view A'-A' with the traces A, B, C bowed downwards. The bias grids and ion collectors only need to be heated once, before a device that includes an electronic portion of a MEMs ion gauge is placed in operation, according to one embodiment. The hot filament is heated during operation, according to another embodiment.

The bowing of tungsten traces A, B, C can be caused by and controlled with the specific geometry of the traces and bowing due to thermal expansion and recrystallization during thermal cycles. Stress-release structure or even the degree of heating can be used to control the amount of bending for traces A, B, C. The built-in stress and the trace taper angle, that results from the profile of the hot filaments 322, bias grids 324, and/or ion collectors 326, can be used to control the direction of the bending. When the long side of the trapezoidal shaped profile is adjacent to the substrate, the hot filament 322, bias grid 324, or ion collector 326 will typically bend in towards a trench 310, according to one embodiment. When the short side of the trapezoidal shaped profile is adjacent to the substrate, a hot filament 322, bias grid 324, or ion collector 326 will typically bend outwards from the trench 310, according to one embodiment. When the profile of a hot filament 322, bias grid 324, or ion collector 326 is rectangular, the direction of bending can not be anticipated, according to one embodiment.

The following is a more detailed description of how thermal cycles can be used for causing traces A, B, C to bend and controlling the bending process. For example, the traces A, B, C can be suspended over a trench 310 with their ends attached at each side of the trench 310 (refer to FIG. 4B). The slenderness ratio for these traces A, B, C with a rectangular profile is $L/k - L(12)^{0.5}/(2t)$ where L is the length 376 of a trace and t is the thinness of the trace. These traces A, B, C bend in towards the trench 310 or outwards from the trench 310 when, for example, the critical forces in Euler's column equation is exceeded, according to one embodiment. The critical force on the traces A, B, C is exceeded, for example, when a current is passed through the trace causing the temperature to rise which in turn generates a force on the column due to thermal expansion. Once a trace A, B, C bends, the degree of permanent bending when the trace is cooled can be controlled by the ultimate trace temperature and the time at which the temperature is reached. The temperature can be controlled at least in part by how much current is passed through a trace A, B, C. If the temperature is high enough and remains hot long enough for re-crystallization to take place, the trace A, B, C can take on a permanent "bow."

According to another embodiment, a straight filament results when both ends of a trace are attached to the same side of a trench 310 with minimal separation between the ends. For example, both ends of trace A are attached to one side of the trench 310 (FIG. 4B) and is straight as depicted in FIG. 4B. According to another embodiment, attaching the ends of a trace to different sides of a trench results in the trace bending. For example, traces B, C have ends attached to different sides of the trench 310 (FIG. 4A) and result in traces B, C that are stretched or bowed (FIG. 4B). According to still another embodiment, the amount of strain relief in a trace can be used, at least in part, to control the amount of bending of a trace. For example, trace C has relatively little strain relief in comparison to trace B as depicted in FIG. 4A. After applying thermal cycles to traces B and C, trace C bows more than trace B as depicted in FIG. 4B.

Alternatively, according to another embodiment, bowed out of plane hot filaments 322, bias grids 324, and/or ion collectors 326 that are bowed out of plane are created by using typical semi-conductor lithography, as is well known in the art.

Figure 5:
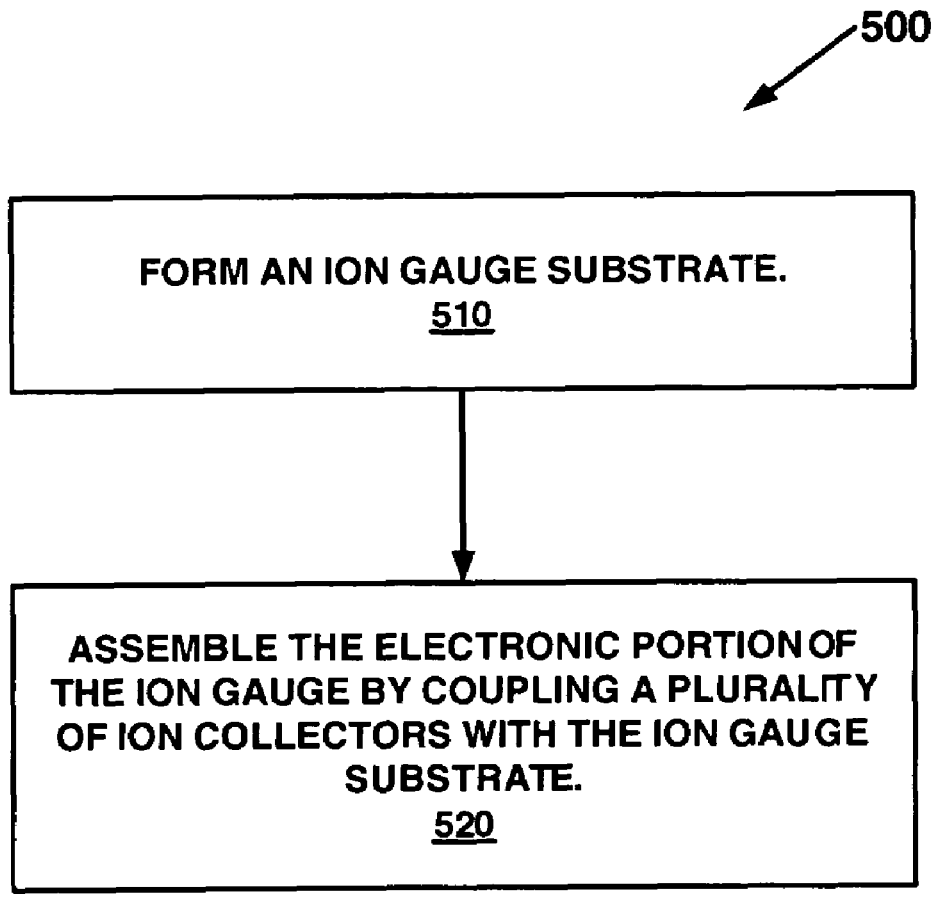
FIG. 5 depicts a flowchart 500 of a method for forming an electronic portion of a MEMs ion gauge that has ion collectors bowed out of plane to form a three dimensional arrangement, according to embodiments of the present invention.

A Method of Forming an Electronic Portion of an Ion Gauge with Ion Collectors that are Bowed Out of Plane FIG. 5 depicts a flowchart 500 of a method for forming an electronic portion of a MEMs ion gauge that has ion collectors bowed out of plane to form a three dimensional arrangement, according to embodiments of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. For the purposes of illustration, the discussion of flowchart 500 shall refer to the structures depicted in FIGS. 6A-6E.

Figure 6A:
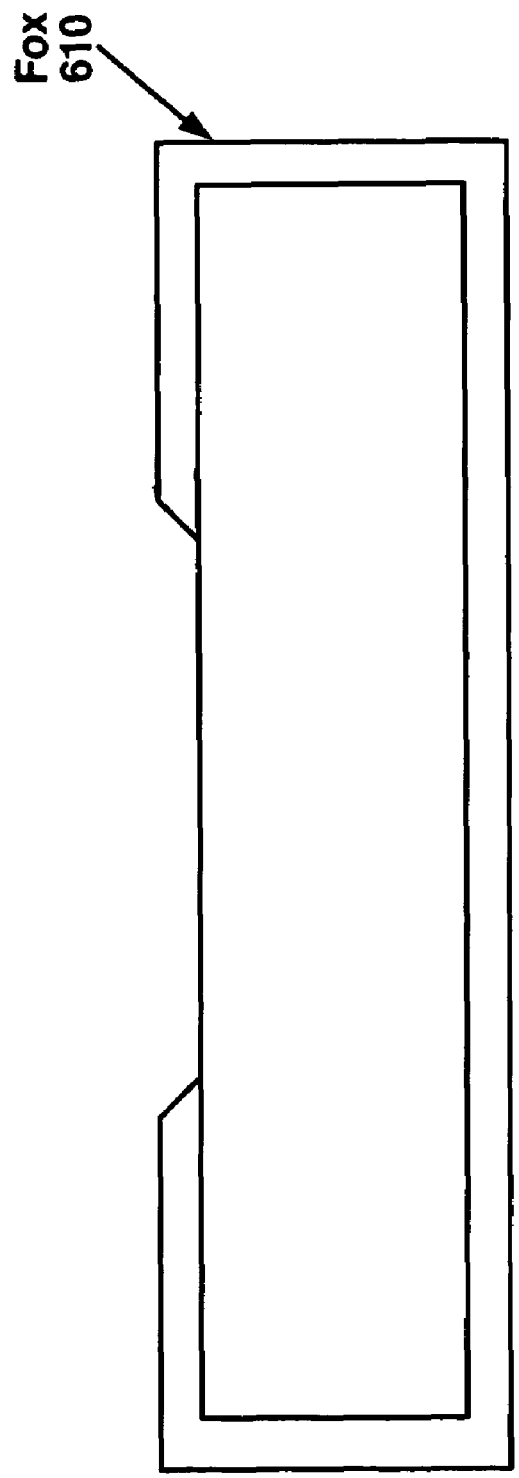
FIGS. 6A-6E depict different phases of forming an electronic portion of a MEMs ion gauge that becomes three dimensional using thermal expansion and recrystallization, according to embodiments of the present invention.

In step 510, an ion gauge substrate is formed. For example, a field oxide 610 (FOX) is patterned and etched as depicted in FIG. 6A to form an ion gauge substrate 340.

Figure 6B:
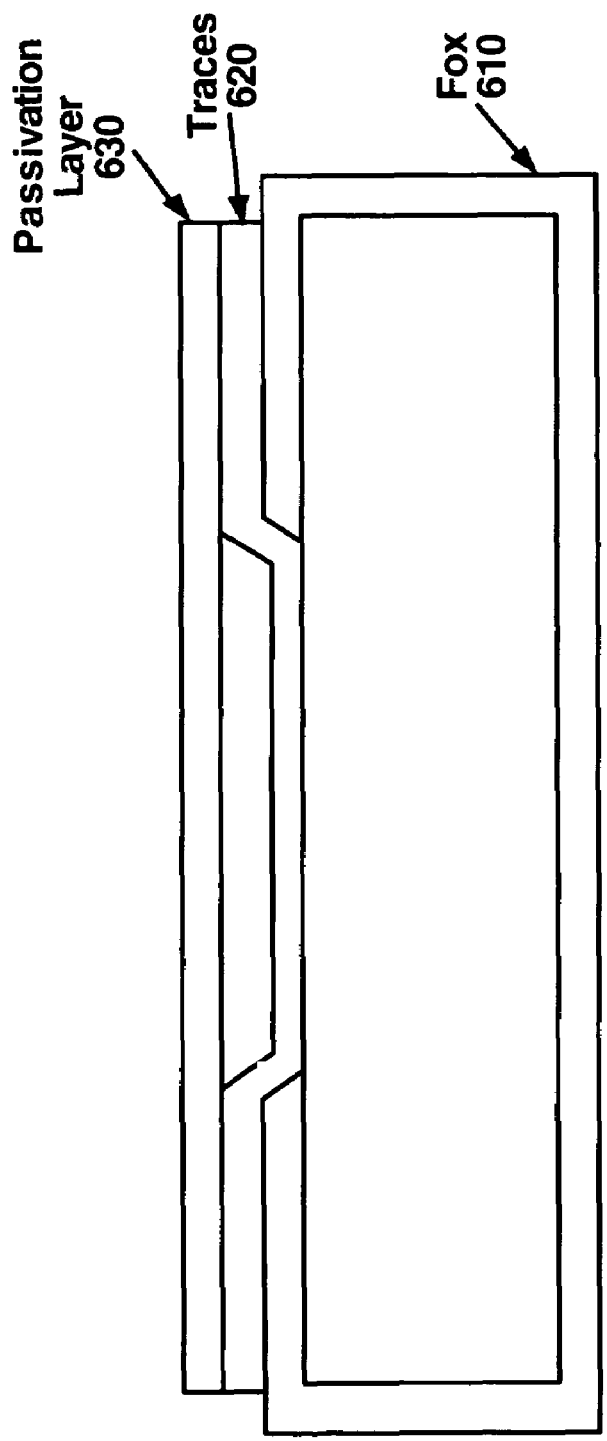
Figure 6C:
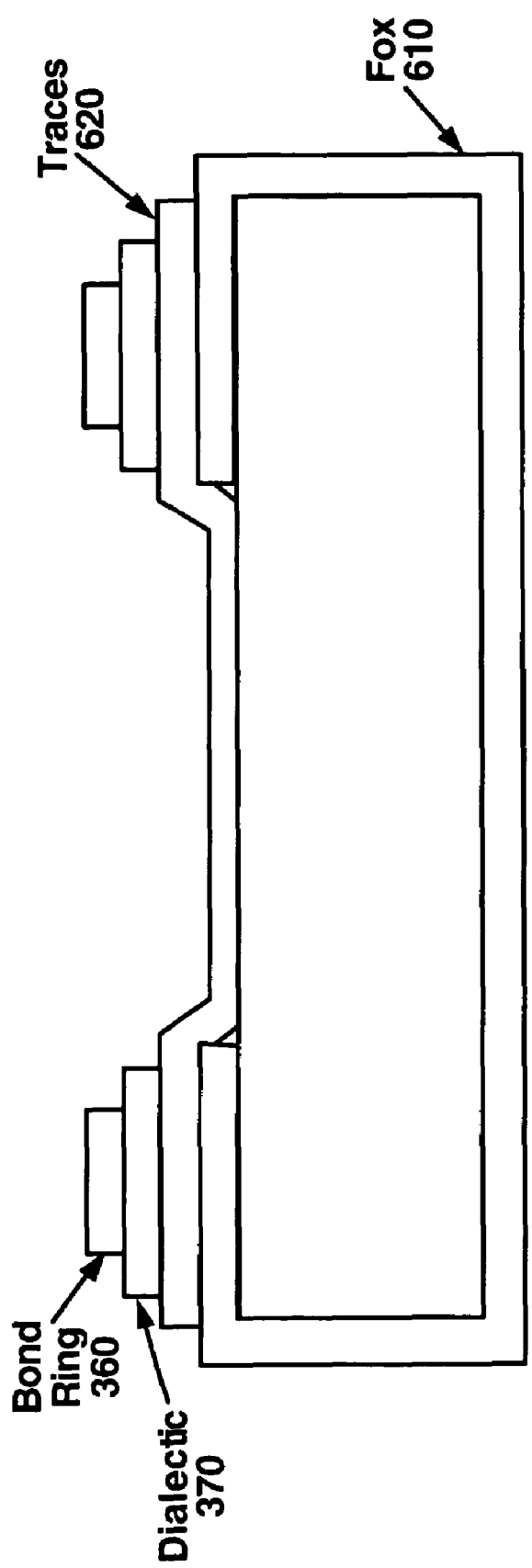
Figure 6D:
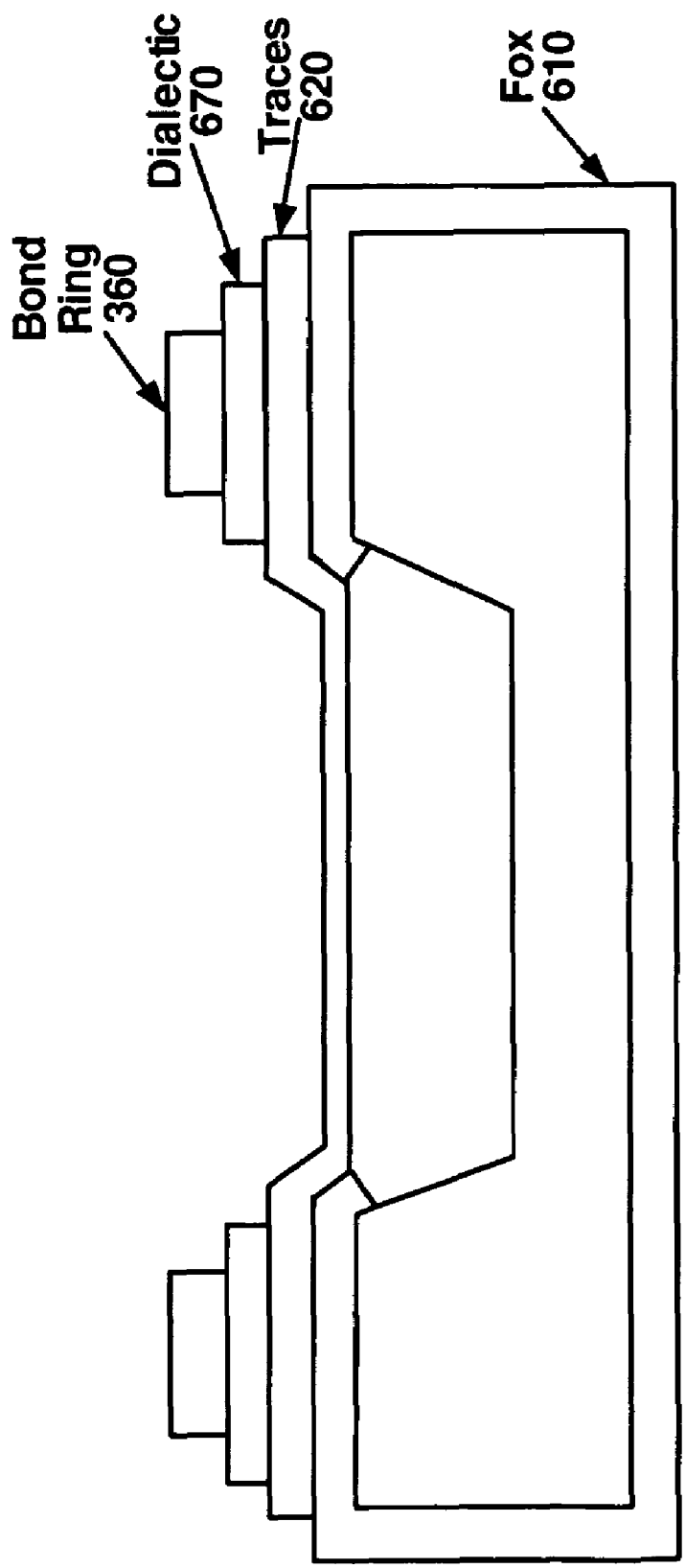
Figure 6E:
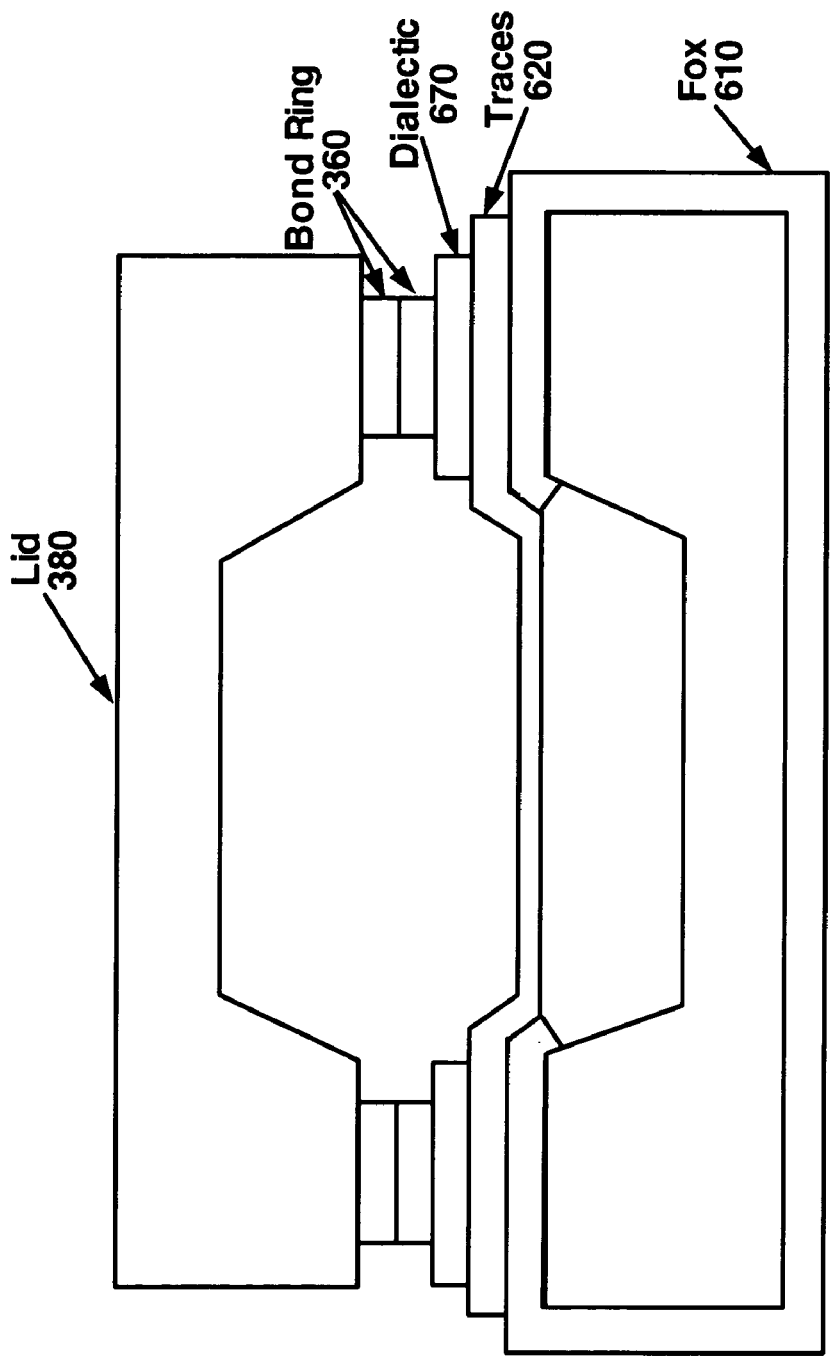

In step 520, the electronic portion of the ion gauge is assembled by coupling a plurality of ion collectors with the ion gauge substrate. For example, traces 620 for the ion collectors 326, as well as hot filaments 322 and bias grids 324 can be put down on the FOX 610 as depicted in FIG. 6B. A passivation layer 630 can be deposited and planarized. A passivation etch is performed to open a trench 310 and the bond pads 350. Bond rings 360 are deposited, patterned and etched as depicted in FIG. 6C. FIG. 6C also depicts a dielectric 670 that was formed from the passivation layer 630. A cavity etch is performed to release hot filament, bias grid and for ion collector traces as depicted in FIG. 6D. A lid 380 is bonded to the ion gauge substrate 340 as depicted in FIG. 6E. Referring to FIG. 3A, an operation is performed that causes the plurality of ion collectors 326 to be permanently bowed out of plane, according to one embodiment. For example, thermal cycles can be used for bowing the plurality of ion collectors 326 out of plane, as already described herein, for example by running a current through selected traces 610 to create an electronic portion of an ion gauge 300A (FIGS. 3A, 3B) with a plurality of ion collectors that are bowed out of plane to form a three dimensional arrangement.

Although the above operational example describes thermal cycles as the operation used to cause the plurality of ion collectors 326 to be bowed out of plane, one or more typical semi-conductor lithography processes can be used as an operation to cause the plurality of ion collectors 326 to be bowed out of plane to form a three dimensional arrangement instead. For the purposes of illustrating embodiments of the present invention using standard semi-conductor lithography techniques, the discussion of flowchart 500 shall refer to the structures depicted in FIGS. 7A-7C.

In step 510, an ion gauge substrate is formed. For example, a field oxide 610 (FOX) is patterned and etched as depicted in FIG. 6A to form an ion gauge substrate 340.

Figure 7A:
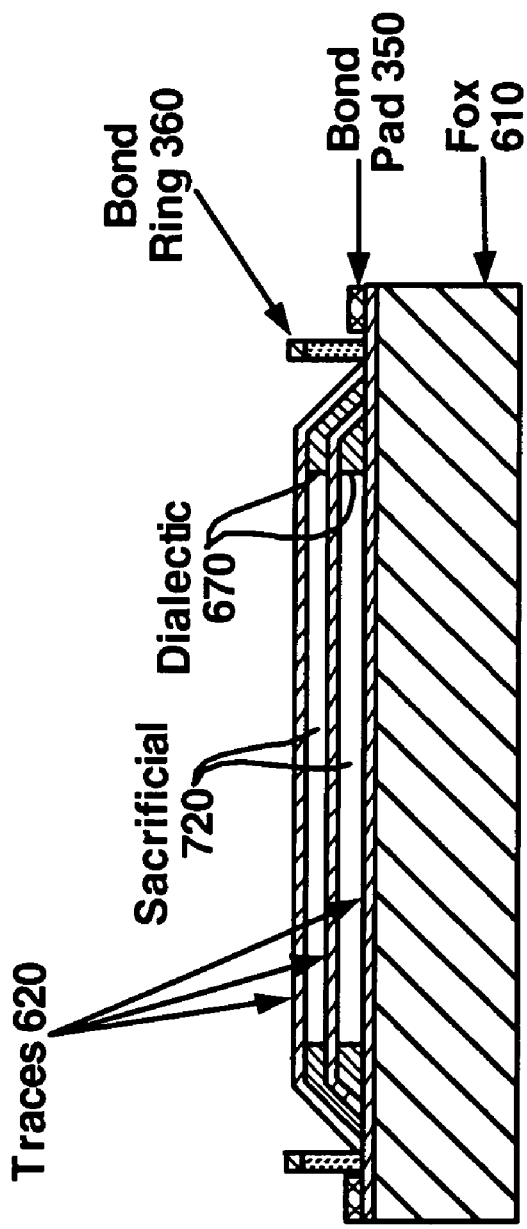
FIGS. 7A-7C depict different phases of forming an electronic portion of a MEMs ion gauge using a combination of standard lithography techniques and hot filaments deformed out of plane using thermal expansion and recrystallization, according to embodiments of the present invention.

In step 520, the electronic portion of the ion gauge is assembled by coupling a plurality of ion collectors with the ion gauge substrate. For example, FIG. 7A depicts a phase of forming a portion of an electronic ion gauge 300B. For example, traces 620 for the ion collectors 326, as well as hot filaments 322 and bias grids 324 can be put down on the FOX 610

Deposition, pattern and etch can be performed to create bond pads 350. Dielectric deposition, pattern and etch can be performed to create dielectric structures 670. A bond pad deposition, pattern, and etch can be performed.

Dielectric deposition, pattern, and etch can be performed to create the lowest dielectric 670. Then sacrificial deposition, pattern, and etch are performed to create the lowest sacrificial structure 720. Then the middle tier of traces 620, the upper dielectric structure 670, and the upper sacrificial structure 720 are created in a manner already described herein. The upper tier of traces 620 is created. Bond ring deposition, pattern, and etch is performed to create bond rings 360.

Figure 7B:
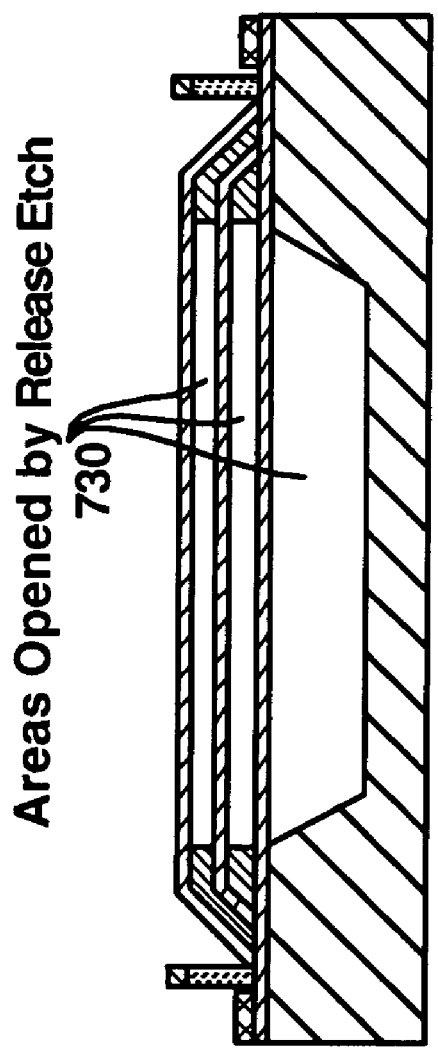
Figure 7C:
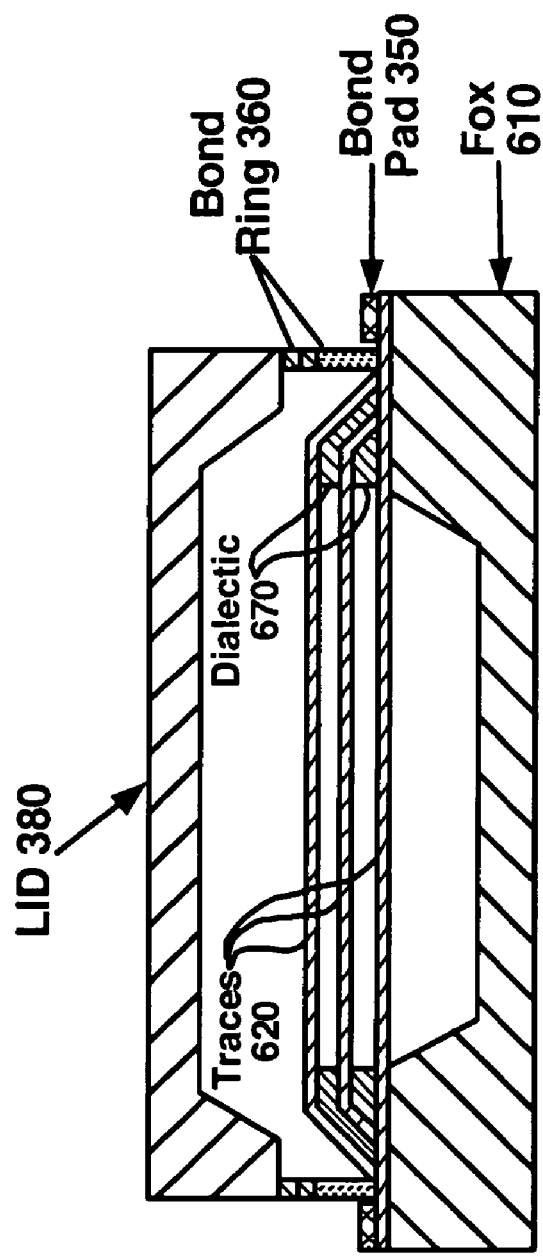

FIG. 7B depicts the a phase of forming an electronic portion of an ion gauge 300B after a release etch has been performed which opens up areas 730, thus, releasing hot filaments, bias grids, and ion collector traces. A lid 380 is bonded to the ion gauge substrate 340 as depicted in FIG. 7C. At this point an electronic portion of an ion gauge 300B (FIGS. 3C, 3D) with a plurality of ion collectors to be bowed out of plane to form a three dimensional arrangement has been created. If desired, a subset of the filaments may be further bowed out of plane permanently. Referring to FIG. 3B, an operation is performed that causes the desired subset of hot filaments, bias grids, or ion collector traces to be permanently bowed out of plane, according to one embodiment. For example, thermal cycles can be used for bowing the plurality of hot filaments 322, as already described herein, for example, by running a current through selected traces 620 to create an electronic portion of an ion gauge 300B (FIGS. 3A, 3B) with a plurality of ion collectors bowed out of plane to form a three dimensional arrangement.

CONCLUSION

An electronic portion of an ion gauge 300A, 300B can be used to accurately measure the vacuum level due at least in part to ion collectors being bowed out of plane as described herein. An electronic portion of an ion gauge 300A, 300B can be used to accurately measure the vacuum level at least in part due to the bond pads 350 being 5000-6000 microns from the trench 310. Referring to FIGS. 3A and 3B, according to embodiments of the present invention, the arrangement of the hot filaments 322, ion collectors 326, and bias grids 324 cover a larger volume (referred to herein as "larger arrangement volume") than the arrangement of hot filaments 122, ion collectors 326 and bias grids 124 in a convention electronic portion of an ion gauge 100 depicted in FIGS. 1A and 1B. An electronic portion of an ion gauge 300A, 300B can be used to accurately measure the vacuum level at least in part due to the "larger arrangement volume," which increases the probability of gas molecules colliding with ions. Embodiments of the present invention provide for bowing the hot filaments 322, ion collectors 326, and/or bias grids 324 out of plane which can be used for providing the three dimensional arrangement with a "larger arrangement volume." Embodiments of the present invention provide for controlling the extent and the direction in which the hot filaments 322, ion collectors 326, and/or bias grids 324 are bowed out of plane which can be used for providing the three dimensional arrangement with a "larger arrangement volume."

As already stated, an electronic portion of an ion gauge 300A, 300B can be used for measuring vacuum levels in MEMs packages. An electronic portion of an ion gauge 300A, 300B can be used for getter material activation in a hermetic package or low-cost replacements of current vacuum tube ion gauges.

Further, an electronic portion of an ion gauge 300A, 300B is small and inexpensive to manufacture since, among other things, it (e.g., 300A, 300B) is a MEMs type electronic portion of an ion gauge, according to embodiments of the present invention.

The figures depicting embodiments of the present invention are not necessarily to scale.

What is claimed is:

1. A method of forming an electronic portion of a MEMs ion gauge with ion collectors bowed out of plane to form a three dimensional arrangement, the method comprising:
    forming an ion gauge substrate; and
    assembling the electronic portion of the ion gauge by coupling a plurality of ion collectors with the ion gauge substrate, via bond pads, wherein the plurality of ion collectors are bowed out of plane with their respective bond pads to form a three dimensional arrangement.

2. The method as recited in claim 1, further comprising;
    assembling the electronic portion of the MEMs ion gauge by coupling one or more hot filaments with the ion gauge substrate, via bond pads wherein the coupling of the one or more hot filaments with the ion gauge substrate further comprises performing an operation that causes the one or more hot filaments to be bowed out of plane with their respective bond pads to form the three dimensional arrangement.

3. The method as recited in claim 1, further comprising;
    assembling the electronic portion of the MEMs ion gauge by coupling one or more bias grids with the ion gauge substrate, via bond pads wherein the coupling of the one or more bias grids with the ion gauge substrate further comprises performing an operation that causes the one or more bias grids to be bowed out of plane with their respective bond pads to form the three dimensional arrangement.

4. The method as recited in claim 1, further comprises:
    forming the one or more ion collectors to have a profile that is selected from a group consisting of a trapezoid shape with the long side adjacent to the ion gauge substrate, and a trapezoid shape with the short side adjacent to the ion gauge substrate.

5. The method as recited in claim 1, further comprises:
    forming the plurality of ion collectors to have a profile that is selected from a group consisting of a trapezoid shape with the long side adjacent to the ion gauge substrate, and a trapezoid shape with the short side adjacent to the ion gauge substrate.

6. The method as recited in claim 1, wherein assembling the electronic portion of the ion gauge further comprises:
    further comprises performing an operation that causes the plurality of ion collectors to be bowed out of plane with their respective bond pads to form the three dimensional arrangement.

7. The method as recited in claim 6, wherein the performing of the operation that causes the plurality of ion collectors to be bowed out of plane further comprises:
    using thermal cycles to cause the plurality of ion collectors to be bowed out of plane with their respective bond pads to form the three dimensional arrangement.

8. The method as recited in claim 6, wherein the performing of the operation that causes the plurality of ion collectors to be bowed out of plane further comprises:
    using semi-conductor lithography to cause the plurality of ion collectors to be bowed out of plane with their respective bond pads to form the three dimensional arrangement.

9. The method as recited in claim 1, wherein the method further comprises:
    forming the electronic portion of the MEMs ion gauge to have a length that ranges from 1 millimeter (mm) to 20 mms, a height that is approximately the height of one to two semi-conductor wafers; and
    forming the electronic portion of the MEMs ion gauge to have a trench, wherein a width of the trench is approximately 0.5 mm.

10. The method as recited in claim 1, further comprises:
    forming the plurality of ion collectors out of a refractory metal.

11. The method as recited in claim 1, further comprising:
    wherein the bond pads are far enough from a trench associated with the ion gauge substrate to not interfere with the accuracy of the electronic portion of the MEMs ion gauge to measure a vacuum level.

12. An electronic portion of a MEMs ion gauge ion collectors bowed out of plane to form a three dimensional arrangement, the electronic portion of the MEMs ion gauge comprising:

an ion gauge substrate; and a plurality of ion collectors assembled with the ion gauge substrate, wherein the plurality of ion collectors are bowed out of plane with their respective bond pads to form the three dimensional arrangement.

13. The electronic portion of the MEMs ion gauge of claim 12, further comprises;

one or more hot filaments coupled with the ion gauge substrate, via bond pads wherein the one or more hot filaments are bowed out of plane with their respective bond pads to form the three dimensional arrangement.

14. The electronic portion of the MEMs ion gauge of claim 13, wherein:

the one or more hot filaments are formed to have a profile that is selected from a group consisting of a trapezoid shape with the long side adjacent to the ion gauge substrate, and a trapezoid shape with the short side adjacent to the ion gauge substrate.

15. The electronic portion of the MEMs ion gauge of claim 12, further comprises;

one or more bias grids coupled with the ion gauge substrate, via bond pads wherein the one or more bias grids are bowed out of plane with their respective bond pads to form the three dimensional arrangement.

16. The electronic portion of the MEMs ion gauge of claim 15, further comprises:

the one or more bias grids are formed to have a profile that is selected from a group consisting of a trapezoid shape with the long side adjacent to the ion gauge substrate, and a trapezoid shape with the short side adjacent to the ion gauge substrate.

17. The electronic portion of the MEMs ion gauge of claim 12, further comprises:

the plurality of ion collectors are formed to have a profile that is selected from a group consisting of a trapezoid shape with the long side adjacent to the ion gauge substrate, and a trapezoid shape with the short side adjacent to the ion gauge substrate.

18. The electron portion of the MEMs ion gauge of claim 12, wherein an operation is used to cause the plurality of ion collectors to be bowed out of plane with their respective bond pads to form the three dimensional arrangement.

19. The electronic portion of the MEMs ion gauge of claim 18, wherein thermal cycles is used to bow the plurality of ion collectors out of plane with their respective bond pads to form the three dimensional arrangement.

20. The electronic portion of the MEMs ion gauge of claim 18, wherein semi-conductor lithography is used to bow the plurality of ion collectors out of plane with their respective bond pads to form the three dimensional arrangement.

21. The electronic portion of the MEMs ion gauge of claim 12, wherein:

the electronic portion of the MEMs ion gauge has a length that ranges from 1 millimeter (mm) to 20 mms, a height that is approximately the height of one to two semi-conductor wafers; and the electronic portion of the MEMs ion gauge has a trench, wherein a width of the trench is approximately 0.5 mm.

22. The electronic portion of the MEMs ion gauge of claim 12, wherein the plurality of ion collectors are formed out of a refractory metal or a refractory metal alloy.

23. The electronic portion of the MEMs ion gauge of claim 12, wherein all bond pads are approximately 5000 to 6000 microns from a trench associated with the ion gauge substrate.

* * * * *

UNITED STATES PATENT AND TRADEMARK OFFICE
CERTIFICATE OF CORRECTION

PATENT NO. : 7,609,067 B1
APPLICATION NO. : 11/269960
DATED : October 27, 2009
INVENTOR(S) : Chien-Hua Chen et al.

It is certified that error appears in the above-identified patent and that said Letters Patent is hereby corrected as shown below:

On the Title page, in field (54), in Title, in column 1, line 1, delete "OF AN" and insert -- OF A MEMS --, therefor.

In column 1, line 1, Title, delete "OF AN" and insert -- OF A MEMS --, therefor.

In column 1, line 57, after "e.g.," delete "lion".

In column 9, line 65, in Claim 2, delete "comprising;" and insert -- comprising: --, therefor.

In column 10, line 1, in Claim 2, delete "substrate, via bond pads" and insert -- substrate via bond pads, --, therefor.

In column 10, line 7, in Claim 3, delete "comprising;" and insert -- comprising: --, therefor.

In column 10, line 10, in Claim 3, delete "substrate, via bond pads" and insert -- substrate via bond pads, --, therefor.

In column 11, line 3, in Claim 12, delete "substrate," and insert -- substrate via bond pads, --, therefor.

In column 11, line 7, in Claim 13, delete "comprises;" and insert -- comprises: --, therefor.

In column 11, line 9, in Claim 13, delete "substrate, via bond pads" and insert -- substrate via bond pads, --, therefor.

In column 11, line 20, in Claim 15, delete "comprises;" and insert -- comprises: --, therefor.

In column 11, lines 21-22, in Claim 15, delete "substrate, via bond pads" and insert -- substrate via bond pads, --, therefor.

In column 12, line 6, in Claim 18, delete "electron" and insert -- electronic --, therefor.

Signed and Sealed this

Twenty-eighth Day of September, 2010

David J. Kappos
*Director of the United States Patent and Trademark Office*